Patented June 24, 1930

1,765,660

UNITED STATES PATENT OFFICE

ARTHUR W. DAWES, OF CEDARHILL, NEW YORK, ASSIGNOR TO GENERAL ANILINE WORKS, INC., OF NEW YORK, N. Y., A CORPORATION OF DELAWARE

REDUCTION OF AROMATIC NITRO COMPOUNDS

No Drawing.  Application filed February 23, 1929.  Serial No. 342,302.

The present invention relates to the reduction of aromatic nitro compounds.

It is known that aromatic nitro compounds can be reduced to the corresponding amino compounds by subjecting them to the action of sodium sulfide or a similar agent under suitable conditions.

I have now found that the use of manganous sulfide as the reducing agent in a neutral solution or in the presence of an alkaline reacting agent offers several advantages over the hitherto used reducing agents.

I prefer to carry out my process by suspending or dissolving the aromatic nitro compound or a salt thereof in an aqueous or non-aqueous medium and heating the reaction mixture in the presence of manganous sulfide either under normal atmospheric conditions or under elevated or diminished pressure.

The following examples illustrate my invention without limiting it thereto, all parts being by weight:

*Example 1.*—168 parts of meta-dinitrobenzene are suspended in about 2000 parts of water; then about 174 parts of freshly prepared manganous sulfide are added, and the reaction mixture is heated at a temperature of about 90° C. until the reaction is completed. The reaction mixture is then acidified with, for instance, hydrochloric acid in order to dissolve the meta-nitro-aniline formed.

After filtration, the meta-nitro-aniline is isolated by decomposing its hydrochloride with a suitable neutralizing agent.

*Example 2.*—The above given example may be changed without altering the result by suspending the meta-dinitrobenzene in a solution of the necessary amount of manganous sulfate and adding then such an amount of sodium sulfide as corresponds in molecular proportions to the manganous sulfate used.

*Example 3.*—184 parts of 1.2.4-dinitrophenol are dissolved in about 2000 parts of water. Then about 300 parts of a caustic soda solution of about 35% and such an amount of manganous sulfide are added as is obtained by precipitating 232 parts of manganous sulfate with about 200 parts of sodium sulfide. The reaction mixture is then heated to a temperature of about 80° C. until the reaction is completed whereafter the 2-amido-4-nitrophenol formed is isolated in the usual manner.

I claim:

1. The process which comprises subjecting an aromatic nitro compound to the action of manganous sulfide.

2. The process which comprises subjecting an aromatic nitro compound to the action of manganous sulfide in an aqueous medium.

3. The process which comprises heating an aromatic nitro compound in the presence of manganous sulfide in an aqueous medium to a temperature of about 80–90° C.

4. The process which comprises dissolving about 184 parts of 1.2.4-dinitro-phenol in about 2000 parts of water adding about 300 parts of a caustic soda solution of about 35% strength and subjecting the reaction mixture to the action of manganous sulfide at a temperature of about 80° C. until the reaction is completed.

In testimony whereof, I affix my signature.

ARTHUR W. DAWES.